United States Patent [19]
Yamamoto et al.

[11] 3,796,475
[45] Mar. 12, 1974

[54] APPARATUS FOR MANUFACTURING DISCHARGE LAMPS

[75] Inventors: Yasuhiko Yamamoto, Kusatou; Sugao Shiemada, Otsu; Suguru Matsumo, Kusatsu, all of Japan

[73] Assignee: New Nippon Electric Company, Ltd., Osaka, Japan

[22] Filed: Apr. 9, 1973

[21] Appl. No.: 349,636

Related U.S. Application Data
[62] Division of Ser. No. 178,749, Sept. 8, 1971, Pat. No. 3,749,468.

[52] U.S. Cl. ............................... 316/27, 74/813 R
[51] Int. Cl. ............................................... H01j 9/46
[58] Field of Search ........ 316/27, 30, 31; 74/813 R, 74/820, 56, 57, 63

[56] References Cited
UNITED STATES PATENTS

| | | | |
|---|---|---|---|
| 1,001,484 | 8/1911 | Weitershausen et al. | 74/813 R X |
| 2,439,884 | 4/1948 | Campbell | 316/27 X |
| 2,725,919 | 12/1955 | Brent et al. | 316/27 X |
| 2,857,787 | 10/1958 | Natalis | 74/813 R X |

*Primary Examiner*—Roy Lake
*Assistant Examiner*—J. W. Davie
*Attorney, Agent, or Firm*—W. G. Fasse

[57] ABSTRACT

A discharge lamp manufacturing apparatus, especially for the manufacture of discharge lamps, is provided with a rotating central valve comprising an annular rotatable plate and an annular stationary plate. The valve is mounted so that the stationary plate is arranged above the rotatable plate. A cooling water tank is arranged in the space centrally of said valve. A driving system for the rotational parts employs reduction mechanisms in which the revolution of a driving device, which drives two turntables in synchronism, is transferred through a pair of cam means to each of said turntables through successively engageable pin rollers mounted on said turntables, said turntables carrying a plurality of spaced chucks for holding glass tube blanks. Each cam means is engaged with its curved surface by one of said pin rollers at a time whereby the turntables move intermittently and in synchronism.

5 Claims, 5 Drawing Figures

PATENTED MAR 12 1974

APPARATUS FOR MANUFACTURING DISCHARGE LAMPS

This is a divisional application of my copending application Ser. No. 178,749 filed Sept. 8, 1971 now U.S. Pat. No. 3,749,468.

BACKGROUND OF THE INVENTION

This invention relates to an apparatus for manufacturing of discharge lamps, and particularly to a glass tube bending and exhausting machine for manufacturing fluorescent discharge lamps, especially circular discharge lamps. The invention is directed to improved arrangements for the turntable driving device, for the central valve, and for the cooling system. Conventional exhausting machines for manufacturing discharge lamps usually employ a central valve having two separable plates. The upper plate is rotatably mounted together with a single turntable, and the lower plate is fixedly secured to a stationary base member. Each of these two plates of the central valve has a contact surface. These contact surfaces contact each other and are provided with a plurality of grooves filled with oil to form a film which provides an airtight connection between these contact surfaces, so as to constitute the exhaust conduit between a vacuum pump and each of the lamp heads on the turntable. However, there has been a problem in that some oil in the grooves tends to migrate or leak toward an air hole connected to the exhaust pipe in the central valve.

In a conventional lamp bending and exhausting machine each initially linear glass tube blank is held on upper and lower chucking means fixed to a single turntable. All the tubes are advanced synchronously and in predetermined intervals for performing the steps of softening, bending, and exhausting each glass tube to produce the lamps. The steps of softening and bending a glass tube require heating means which is able to maintain the temperature at about 900° C to 1,000° C, and which is installed in the path of the blanks. The temperature of the central valve is thereby greatly increased by the heat from the heating means whereby the vaporization of the above mentioned oil which migrates toward the air hole is accelerated, and undesired residual gases result in the exhaust line connected to the blanks. In addition, contaminating gasses, such as carbon dioxide, are also generated within the blanks, so that the degree of vacuum is decreased and the operating characteristics of the finished lamps are deteriorated by the presence of such undesired gases. The provision of cooling means employing air blowing ducts or water piping has been proposed to cool the central valve, but such cooling has been insufficient due to the existence of heated air around the machine.

In other words, the space below the central valve of the conventional arrangement in which the stationary valve plate is installed, is necessarily filled up with the piping of the exhaust line or conduits, and with the water, air, or gas pipes required for the cooling or heating means. The central portion of the machine is thus so complicated that when the central valve must be repaired or overhauled, various pipes of the piping in and around the central valve must be lifted by using a lifting device such as a chain block. Therefore, the disassembly and reassembly of the pipes which fill the central portion of the machine is troublesome and requires much time so that the productivity is reduced by frequent repairs or overhauls.

On the other hand, the driving device for the turntable connected to the rotatable plate of the central valve must maintain the accurate synchronous movement of both ends of each linear glass tube held on the turntable within exact intervals, in order to prevent damages to the tubes by deformation and twisting as a result of different phases in the motion of the upper and lower ends of the linear glass tubes, which ends are held by said chucking means.

Since a pair of chucks each having arms of different length for holding each end of a linear blank, has been secured heretofore to a single turntable, such deformation and twisting could not be removed completely in previous machines. Thus, heretofore it was not possible to construct a drum turret type of turntable due to the location of the heating means or oven in the path of the chucked blank. Therefore, the lower-side chuck which holds the lower end of the linear blank had a relatively long arm, and the lower portion of the linear blank could be easily vibrated for a short time without momentarily stopping its vibratory movement when the single turntable was stopped by the driving device. Thus, the linear glass blank is easily broken in the conventional machine.

In addition, the chucking means easily oxidized and eroded since it passed through the heating oven, so that inspection and overhaul of the chucking means are required frequently in such prior art machines. Inspection and overhaul, as above noted, were very difficult.

OBJECTS OF THE INVENTION

Accordingly, an object of this invention is to eliminate the disadvantages of prior machines and to provide an improved bending-exhausting machine for manufacturing discharge lamps. Especially, the invention aims at solving the problem of arranging the cooperating elements of a discharge lamp manufacturing machine in such a manner relative to each other that an easy access is assured, while simultaneously maintaining the high sealing requirements necessary for establishing a satisfactory vacuum, and holding the tubular blanks so rigidly that they cannot vibrate whereby to avoid breakage.

SUMMARY OF THE INVENTION

According to the invention there is provided a rotating valve, especially for a discharge lamp manufacturing apparatus, which has a stationary valve member arranged vertically above a rotating valve member so that the rotating member supports the stationary member. The valve members are preferably annular to provide a central easy access space, and in heat transfer contact with at least one of said valve members.

In accordance with an additional aspect of this invention, there is provided an integrated driving system for a discharge lamp manufacturing apparatus, which system comprises a pair of annular turntables each having a plurality of exhaust heads, chucks and pin-rollers spaced at equal intervals, a pair of cylindrical cams each engaging sequentially, one after the other, said pin-rollers, a pair of reduction mechanisms for driving the respective cylindrical cam, and a driving device in common for both cams to drive the turntables in synchronism and at a predetermined intermittent speed.

According to the invention, there are also provided means for indicating the amount of sealing fluid leaking from said central valve whereby to monitor the operating efficiency of the central valve.

BRIEF DESCRIPTION OF THE FIGURES

In order that the invention may be clearly understood, it will now be described, by way of example, with reference to the accompanying drawings, wherein.

DESCRIPTION OF A PREFERRED EMBODIMENT

Figure 1:
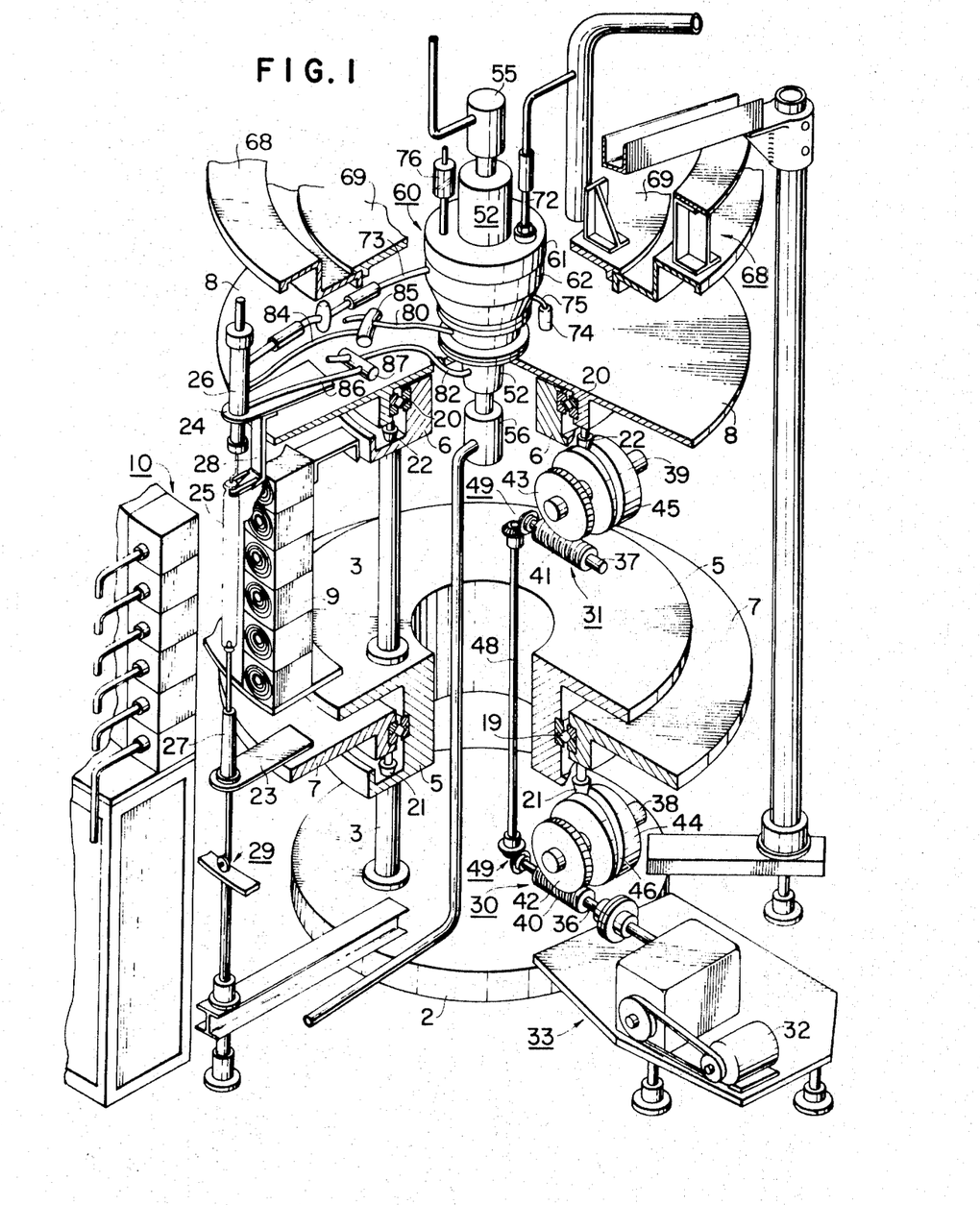
FIG. 1 is a perspective elevation, partially in section, illustrating a discharge lamp manufacturing machine, especially a bending and exhausting machine embodying the present invention, in which the components of the machine unnecessary for the understanding of the invention have been omitted.
Figure 2:
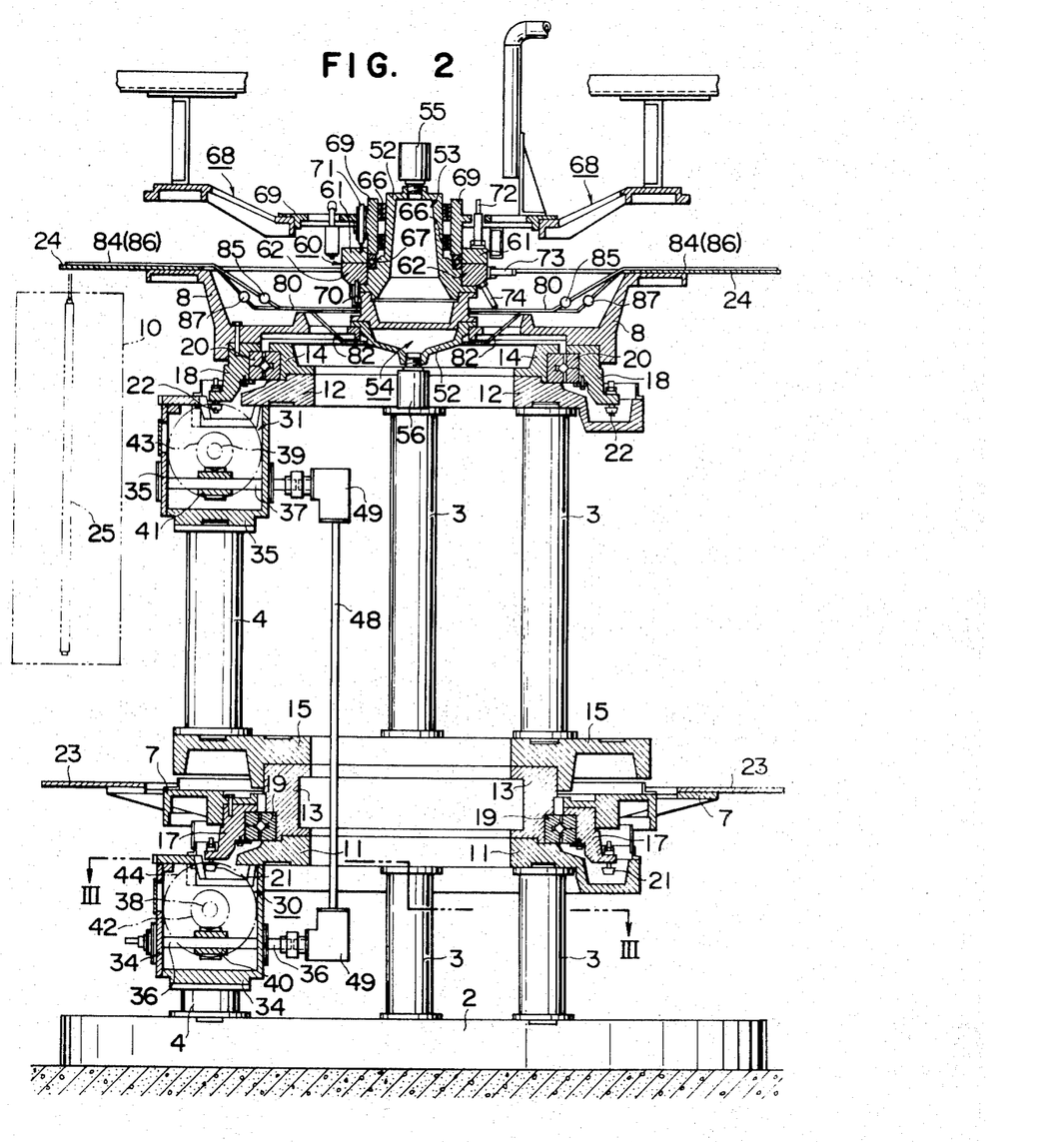
FIG. 2 is a partial longitudinal section through the bending-exhausting machine of FIG. 1 illustrating the machine in somewhat greater detail.

FIGS. 1 and 2 illustrate the bending-exhausting machine 1 secured to a base member 2. Only the main components of the machine as related to the invention are shown. The machine comprises three main supporting poles 3, only one of which appears in FIG. 1 for simplicity, and an auxiliary pole 4 seen in FIG. 2. The poles extend upwardly from the base 2 and each pole is divided into two parts for supporting the drive system. The supporting poles 3 support a lower frame member 5 and an upper frame member 6, and these frames support rotatable turntables 7, 8 respectively and a plurality of fixed inside burners 9 of a heating oven 10, as shown in FIG. 1.

Preferably, the frame member 5 includes three annular stationary frames 11, 13, and 15 (FIG. 2) fixed to an intermediate portion of the poles 3. The upper frame member 6 includes two stationary members 12 and 14 fixed to the upper end of the poles 3. Lower and upper pin wheels 17, 18 respectively are mounted on the under sides of the turntables 7, 8 as shown in FIG. 2 and form a part of the turntables. Cross-roller bearings 19, 20 are arranged between the pin wheels 17, 18 and the annular frames 11, 12, 13, 14, respectively for rotating the turntables 7, 8. A plurality of equally spaced lower pin-rollers 21 are mounted under the periphery of the pin wheel 17. Similarly, a plurality of upper pin-rollers 22 are mounted on the pin wheel 18.

The lower turntable 7 which forms an integral structure with the pin wheel 17 has a plurality of radially extending arms 23 at the periphery thereof, only one arm 23 is shown in FIG. 1. The upper turntable 8 which forms an integral structure with the pin wheel 18 has a plurality of arms 24 radially extending at the periphery thereof, only one arm 24 is shown in FIG. 1.

A linear blank 25 of a glass tube indicated by dashed lines is held by chucking means attached to each of the arms 23 and 24 and extends between the arms 23 and 24. An upper chuck 28 at each arm 24 holds the upper end of the linear blank 25 so as to connect an exhausting tube of the blank 25 with an exhausting head 26 arranged on each of the arms 24. The lower end of each linear glass tube 25 is held by a separate adjustable support 27 which is attached to each of the arms 23 and held by guide means 29 as shown in FIG. 1. The guide means may comprise, for example, a roller positioned to ride on a fixed annular ring. While only one blank 25 is shown, a plurality of such blanks are actually mounted on the turntables 7, 8 for sequential processing in the machine. The components of the machine for bending the tubes do not form a part of the invention, and hence such components have been omitted to avoid confusion in understanding the invention. Conventional components may be provided for this purpose.

A pair of gear and cam reduction mechanisms 30, 31 which are arranged beneath each of the pin wheels, 17, 18 of the turntables 7, 8, are mounted on the auxiliary pole 4 (FIG. 2) for reducing the revolution of the drive shaft driven by a drive motor 32 of a common fixed driving device 33. Within a pair of gear boxes 34, 35 of the reduction mechanisms 30, 31, (FIG. 2) two rotating shafts 36, 37 and 38, 39 respectively are arranged relatively crosswise for transferring the rotary movement to the turntables. The rotating shafts 36, 37 are provided with worm gears 40, 41, respectively and the rotating shafts 38, 39 carry worm wheels 42, 43 coupled to the worm gears 40, 41 and to cam means of cylindrical cams 44, 45.

Figure 3:
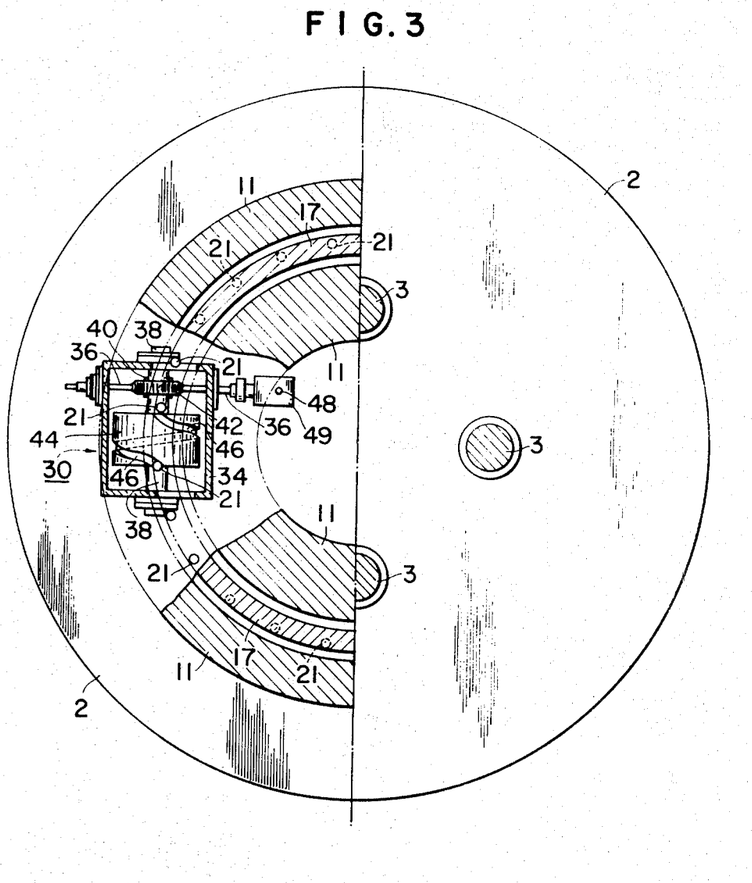
FIG. 3 is a cross section taken along the line III—III of FIG. 2.

FIG. 3 shows the components of the driving system for the lower turntable. On the surface of the cylindrical cam member 44 there is formed a spiral groove 46 having a locus equal to the pitch spacing between two pin-rollers 21. Therefore, when the worm 40 engages the worm wheel 42 one after another of the pin rollers 21 of the pin wheel 17 is engaged with the groove 46 of the cylindrical cam 44 so as to provide an intermittent rotation to the lower annular turntable 7 by means of the pin wheel 17. The rotation of the rotating shaft 36 is transferred to the rotating shaft 38 by the worm gear 40 and worm wheel 42, and further transferred by the pin wheel 17 to the turntable 7 by way of the cylindrical cam 44 and the pin rollers 21. The upper components of the driving system have the same construction and perform the same function as mentioned above whereby for each revolution of the cam member one of the pin rollers is engaged with the groove of the respective cam member.

Returning to FIGS. 1 and 2, the rotating shafts 36, 37 in the gear and cam reduction mechanisms 30, 31 are connected to each other by coupling means comprising a connecting rod 48 and a pair of bevel gear means 49. Therefore, rotation of both turntables can be effected by the common driving device 33 which is connected to one of the rotating shafts 36, 37. In other words, when the driving device 33 is operated, the same rotation is achieved by transferring rotation to both rotating shafts 36, 37 by way of the connecting rod 48 and the pair of bevel gears 49.

A heating oven 10 with a plurality of gas burners 9 is arranged between upper and lower turntables. The linear blanks 25 are heated by the oven 10 and softened for bending and exhausting the glass tube. As above stated, only one tube is indicated by dashed lines. However, all tubes are heated in succession.

Figure 4:
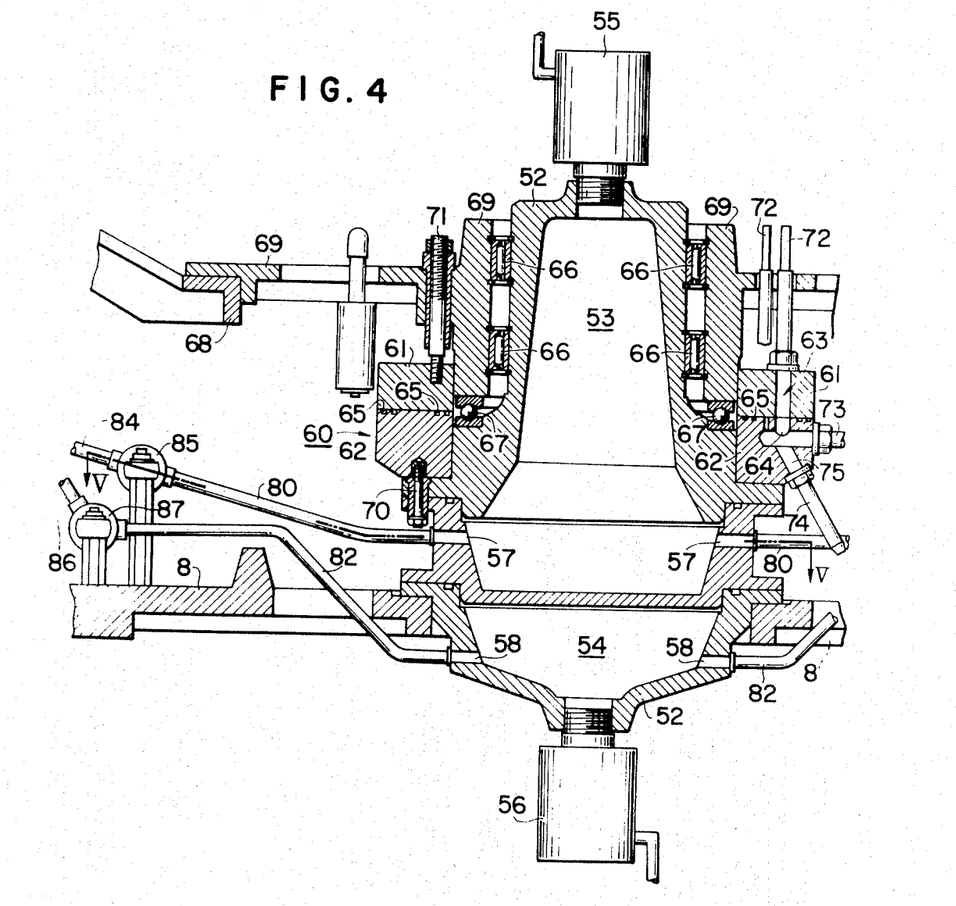
FIG. 4 is an enlarged partial longitudinal section of the upper portion of the bending-exhausting machine of FIG. 2.

Referring now to the FIGS. 1 and 4, therein is shown the central valve portion in which a water tank 52 having an upper chamber 53 and a lower chamber 54 is integrally installed at the center portion of the upper turntable 8. A rotary pressure joint 55 is attached to the upper chamber 53 for filling cooling water into the top of the water tank 52. A rotary pressure joint 56 is attached to the lower chamber 54 for removing water from the lower chamber 54. A plurality of holes 57 and 58 for water circulation is formed in the side walls of each of the chambers 53 and 54.

An annular central valve 60 comprised according to the invention of an upper stationary plate 61 and a lower rotatable plate 62 has a center hollow within which the water tank 52 is positioned. The outer wall of the water tank 52 is directly connected to the rotatable plate 62. The stationary plate 61 of the central valve 60 has a plurality of air holes 63 spaced about its periphery. Only one air hole appears in FIG. 4. The rotatable plate 62 of the central valve 60 has a plurality of spaced air holes 64 (only one of which appears in FIG. 4) and grooves 65 on its top surface. The air holes 64 are aligned with the air holes 64. The weight of the stationary plate 61 is substantially supported on the surface of the rotational plate 62, so as to provide an air-tight connection between these two surfaces.

The grooves 65 are filled with lubricating oil to assure a tight connection and to reduce frictional resistance caused by the rotational movement between the two plates 61 and 62 of the entral valve 60, thereby preventing sintering. Bearing means including needle bearings 66 and thrust ball bearings 67 are located between the water tank 52 and an annular stationary frame 69 which is removably attached to an outer frame member 68 of the bending-exhausting machine as shown in FIG. 1.

As shown in FIG. 4, the stationary plate 61 is attached to the annular stationary frame 69 by connecting means such as bolts 71, and the rotatable plate 62 is coupled to the water tank 52 by connecting means such as bolts 70. A separate pipe 72 is connected to each of the air holes 63 in the stationary plate 61, and the exhaust line (not shown) is connected to the pipes 72 (only one of which appears in FIG. 1). The exhaust line also supplies filling gas for the glass tubes if desired. A separate air pipe 73 is connected to each of the air holes 64 of the rotatable plate 62 of the central valve 60, and each air pipe 73 (only one of which is shown in FIG. 1) is connected as a separate exhaust head 26 on the arms 24.

A separate transparent glass tube 74, only one of which is shown in FIG. 1, is connected by way of a separate pipe 75 to each air hole 64 for oil pooling so as to pool immigrated or leaked oil from the contact surfaces of the stationary plate 61 and the rotatable plate 62 of the central valve 60. As seen in FIG. 1, lubricant oil is supplied from an oiler 76 suitably connected to the valve 60. The amount of oil leaked from the central valve 60 to the tube 74 indicates the operational conditions of the central valve 60 and the extent of the resistance in the exhaust line. This is an advantage of the present invention because the amount of leaked oil is visually apparent due to the use of the transparent glass tubes 74.

Figure 5:
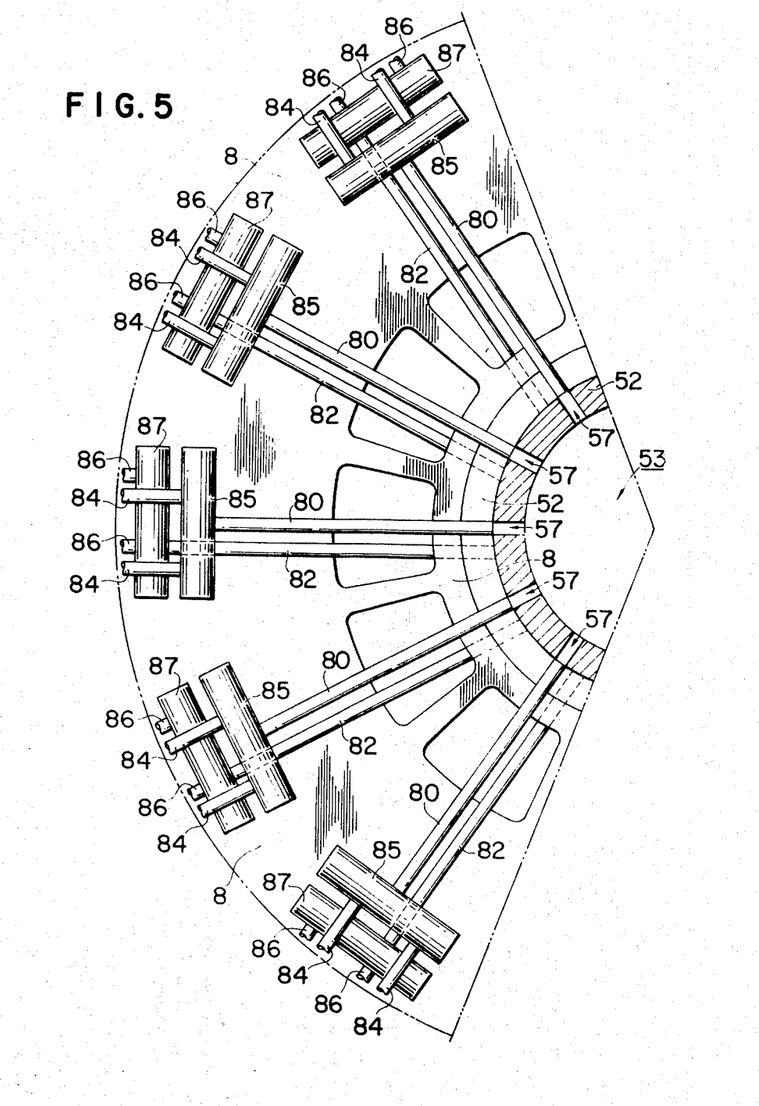
FIG. 5 is a cross section taken along the line V—V of FIG. 4.

As shown in FIGS. 4 and 5, a separate water supplying pipe 80 is connected to each of the holes 57 for water circulation in the upper chamber 53 of the water tank 52, and a separate water discharge pipe 82 is connected to each of the holes 58 for water circulation in the lower chamber 54 of the water tank 52. Branched pipes 84 and 86 of manifolds 85 and 87 which are coupled to each of the water supplying pipes 80 and the water discharge pipes 82, are mounted on the peripheral surface of the arms 24 of the turntable 8 (seen in FIG. 1) for cooling the exhaust heads 26. That is, cooling water furnished to the upper chamber 53 of the water tank 52 from the rotary pressure joint 55 flows into the lower chamber 54 by passing through the water circulation holes 57, water supplying pipes 80, manifolds 85, branched pipes 84 and 86, manifolds 87, water discharge pipes 82, and water circulation holes 58, and is exhausted from the rotary pressure joint 56.

The circulation of cooling water through the pipes is therefore effective in cooling the central valve 60 and the exhausting heads 26. Cooling of the rotatable plate 62 of the central valve 60 is particularly effective, since the water tank 52 is directly connected to the inner and bottom walls of the central valve 60, and absorption of heat energy of the rotatable plate 62 due to circulation of cooling water is greater than that of the stationary plate 61 of the central valve 60. It is also possible to shield radiation from the heating oven 10, by arrangement of the manifolds 85 and 87, water supplying pipe 80, water discharge pipe 82 and the like, so as to cool the zone around the top of the turntable 8.

In the above mentioned construction, when the common driving device 33 is connected to the lower reduction mechanism 30, rotation of the rotating shaft 36 is transmitted to the rotating shaft 37 of the upper reduction mechanism 31 by way of the bevel gear means 49 so that both rotating shafts 36, 37 can be rotated simultaneously at a high speed. Although some deviation of the speed between these two rotating shafts 36, 37 is possible due to back-lash of the bevel gear means 49 or twist of the connecting rod 48 as the revolution speed varies, the difference of speeds is significantly minimized at the rotating shafts 38, 39 due to the reduction of speed of revolution by means of the reduction mechanisms 30, 31. The small difference in the speeds of the rotating shafts 38, 39 is substantially removed by the reduced revolution speed of the pin wheels 17, 18 and the turntables 7, 8 due to the use of cylindrical cams 44, 45, so that the synchronized operation of the upper and lower arms 23, 24 is achieved at the predetermined desired intervals. This is also a substantial advantage of the invention.

The upper turntable 8 is thus integrally rotated simultaneously with the water tank 52 and the lower rotatable plate 62 of the central valve 60, and the complete air circulation path is intermittently formed through the air hole 64 of the rotatable plate 62, and the hole 63 of the stationary upper plate 61. Consequently, all the blanks 25 are exhausted and filled with a desired gas necessary for completing the discharge lamps.

Since the water tank and piping of the present invention are arranged above the upper turntable, due to the location of the stationary plate 61 above the rotatable plate 62, the structure of the machine is simplified. Which is also a great advantage of the invention. In other words, since according to the invention the water tank 52 and the piping are eliminated from the space between the upper turntable and the lower turntable, the necessary piping can be installed without affecting the internal structure of the bending-exhausting machine so as to facilitate repair and overhaul thereof.

Additionally, since the oil pipes 75 connected to each of the air holes 64 of the central valve are connected to the transparent tubes 74 for oil pooling, oil leaked from the contact surfaces of the stationary plate 61 and rotatable plate 62 can be pooled within the transparent tubes 74. Accordingly, there is no residual oil near the air holes of the central valve, and there is no decrease in the degree of vacuum. It is also very advantageous that the amount of oil leaked can be visually observed due to the transparency of the oil pooling tubes 74.

In another aspect of the invention, the cooling means for the machine is comprised of the water tank disposed in the central hollow of the central valve having high heat conductivity, and by the water piping extending to the exhaust heads, thereby forming a cooling zone in the space surrounded by the central valve. Therefore, the central valve and exhaust heads can be efficiently cooled, and a decrease in the degree of vacuum resulting from vaporization of oil present in the region adjacent the air holes of the central valve can be completely prevented. There are no leaks of cooling water and no generation of water drops by a closed circuit in the arrangement according to this invention. These are also essential aspects of the present invention.

Further, since the driving system of the present invention comprises a pair of turntables having a plurality of spaced chucks and heads, a pair of pin wheels having pin rollers, a pair of cam means having a cam locus shaped to engage one of the pin rollers at a time, and a common driving means connected to each cam means through a pair of reduction mechanisms to rotate both turntables at the synchronous speed, the upper and lower chucks attached to each periphery of the turntables are rotated with the same phase between the upper and lower ends of the linear glass tube before bending. Therefore, damage of the linear glass tube is prevented by using the device according to the present invention.

In addition, it is possible to construct a large-size and high speed machine for increasing productivity according to the invention. Since the construction is simplified and provides a large space between the upper and lower turntables, such large space can be utilized effectively for maintenance, overhaul and repair of the machine.

Although the invention has been described with reference to a specific example, it is to be understood that it is intended to cover all modifications and equivalents within the scope of the appended claims. Thus, for example, the present teaching is not limited to circular fluorescent lamps, but is equally applicable to the manufacture of longitudinal fluorescent lamps.

What we claim is:

1. An indexing apparatus for the manufacture of discharge lamps comprising first and second coaxial vertically spaced apart annular turntables, means for holding discharge lamps between the peripheries of said turntables for processing said lamps, a base, first and second annular coaxial vertically spaced apart frames, means supporting said first frame above said base, means supporting said second frame above said first frame, means mounting said first and second turntables for rotation on said first and second frames respectively, a plurality of pin rollers extending downwardly from each of said turntables, said pin rollers being equally spaced apart on each turntable and equally spaced from the axis of rotation thereof, a first cam means mounted between said base and first frame and positioned to sequentially engage the pin rollers of said first turntable, a second cam means mounted between said first and second frames to sequentially engage the pin rollers of said second turntable, and means for simultaneously driving said cam means comprising a drive device, means coupling said drive device to said first cam means, and shaft means extending vertically through a central aperture of said first frame and first turntable for coupling said first cam means to said second cam means.

2. The apparatus of claim 1, wherein said means for simultaneously driving said cam means comprises separate reduction means coupled to each of said cam means.

3. The apparatus of claim 1, wherein said means supporting said first frame above said base comprises a plurality of first posts extending between said base and said first frame, and wherein said means supporting said second frame above said first frame comprises a plurality of second posts extending between said first frame and said second frame.

4. The indexing apparatus of claim 3, wherein said first frame comprises a lower annular frame, said first posts extending between said base and said lower annular frame, a second annular frame spaced above said lower annular frame, said second posts extending between said upper annular frame and said second frame, and a third annular frame between said upper and lower annular frames, said upper and lower annular frames extending radially outwardly beyond said third annular frame and wherein said means for mounting said first turntable for rotation on said first frame comprises bearing means for rotatably supporting said first turntable between said upper and lower annular frames.

5. The indexing apparatus of claim 4, comprising post means extending upwardly from said upper annular frame for supporting said second cam means, and means for supporting said first cam means on said base.

* * * * *

UNITED STATES PATENT OFFICE
CERTIFICATE OF CORRECTION

Patent No. 3,796,475　　　　　　　Dated March 12, 1974

Inventor(s) Yasuhiko Yamamoto et al

It is certified that error appears in the above-identified patent and that said Letters Patent are hereby corrected as shown below:

[75]　Inventors:　　　　Yasuhiko Yamamoto, Kusatsu;
　　　　　　　　　　　　Sugao Shimada, Otsu; Suguru
　　　　　　　　　　　　Matsuno, Kusatsu, all of Japan

[30]　Foreign Application Priority Data

Sept. 28, 1970　　　Japan　　　　　　45-96485

Signed and sealed this 3rd day of September 1974.

(SEAL)
Attest:

McCOY M. GIBSON, JR.　　　　　　　　C. MARSHALL DANN
Attesting Officer　　　　　　　　　Commissioner of Patents